3,508,049
CORPUSCULAR-RAY MICROSCOPE WITH AN OBJECTIVE LENS WHICH ALSO FORMS A CONDENSER-LENS FIELD
Wolfgang Dieter Riecke, Berlin, Germany, assignor to Max-Planck-Gesellschaft zur Forderung der Wissenschaften e.V., Gottingen, Germany, a corporation of Germany
Filed July 27, 1967, Ser. No. 656,402
Claims priority, application Germany, Feb. 27, 1967, M 72,925
Int. Cl. H01j 37/26
U.S. Cl. 250—49.5
4 Claims

ABSTRACT OF THE DISCLOSURE

An electromagnetic objective lens in corpuscular-ray microscope, such as an electron microscope, has a condenser-lens field which is directed toward the beam source and throws an image of an apertured area-limiting diaphragm onto the object plane of the objective lens proper, the object plane being electron-optically defined by a beam-transversal plane in the region where the objective lens has substantially maximal field strength. An axial-shift device is connected with the specimen carier for displacing it at constant magnetomotive force (ampere turns) of the objective lens within an axial displacement range within which all of the details to be investigated of any applicable specimen, regardless of its axial limension, can be shifted into the object plane where the image of the aperture diaphragm is also located. The axial-shift device is operated from the outside of the microscope by a gear, transmission acting on a cylindrical support for the specimen carrier which support coaxially surrounds the beam axis. In another embodiment the shift device is actuated from the outside by means of a cam mechanism which angularly displaces the specimen carrier about a pivot in the upward or downward direction.

My invention relates to corpuscular-ray microscopes, preferably electron microscopes, although it is also applicable to ion microscopes. In a more particular aspect the invention concerns microscopes equipped with a source of the electron or charge-carrier beam, means for focusing the corpuscular beam, an electromagnetic objective lens, a carrier for accommodating a specimen substantially in the axial region where the objective lens has maximal field strength, and an area-limiting aperture diaphragm in front of the entrance pupil plane of the objective lens which also forms a condenser-lens field that produces an image of the diaphragm in the object plane of the objective lens proper. In such microscopes the aperture diaphragm is arranged at such an axial location relative to the focusing means that the beam rays passing through the diaphragm aperture are converged by the focusing means to a beam cross section of high current intensity in the entrance pupil plane of the objective lens.

The above mentioned focusing means may consist in known manner of further condenser lenses on any desired number, or they may be formed by a so-called Steigerwall system in which the focusing effect is produced by a particular design of the Wehnelt cylinder (cylindrical electrode) which forms part of the beam producing system.

An electron microscope of the type just described is known, for example, from a paper by W. D. Riecke and E. Ruska "A 100 kv. Transmission Electron Microscope With Single-Field Condenser Objective" in the publication of the Sixth International Congress for Electron Microscopy, 1966, pp. 19 and 20. This microscope is equipped with two further condenser lenses located in the beam issuing direction ahead of the condenser constituted by the pre-field of the objective lens. The first condenser lens counted in the beam issuing direction produces a greatly reduced image of the smallest beam cross-section (crossover) in front of the cathode; and the second condenser lens forms a second image of slightly magnified or demagnified size. The utilization of the always present pre-field of the objective lens to also operate as a condenser lens of short-focal length, in combination with an area-limiting aperture diaphragm in front of the entrance pupil of the objective lens, offers the advantageous possibility of adjusting the radiation (illumination) aperture for the specimen and the beam cross section within the specimen plane, i.e. the size of the irradiated specimen area, independently of each other. This is because the illumination aperture for the specimen, neglecting the effects of lens faults, is determined exclusively by the size of the image produced by the second condenser, whereas the size of the irradiated or illuminated area on the specimen is given exclusively by the aperture diameter of the diaphragm. By greatly reduced imaging of the aperture diaphragm into the object plane of the objective lens field with the aid of the short-focal condenser lens formed by the pre-field of the objective lens, very small illuminated specimen areas can be obtained by means of diaphragms whose aperture diameter is still of a size which can conveniently be produced; for example a 700 A. diameter of the illuminated specimen area can be obtained with an aperture diaphragm of 10 micro-meter ($\mu$m.) diameter the pre-field condenser lens effecting a demagnification by a factor of about 140.

An analogous advantage is attained if the focusing of the corpuscular beam is effected by a different number of condenser lenses or if a Steigerwall system is employed.

The term "object plane" should be clearly distinguished from the term "specimen plane." The object plane is that electron-optically determined plane within the objective lens field which is focused onto the observation plane, i.e. the fluorescent screen. It lies in the region where the field strength of the objective lens field is at its maximum or is best suitable for microscopic investigation of the specimen. The "specimen plane" is the plane where the specimen is actually located on the specimen carrier and, while this plane in the ideal case should be coincident with the object plane, such coincidence is not always established or applies only along a certain cross section of the specimen orthogonal to the lens axis rather than through its entire axial height.

An essential object of the corpuscular-ray microscope according to the invention, therefore, is the requirement to meet two conditions, namely, the sharp aljustment of the specimen relative to the objective lens and the sharp imaging of the area limiting aperture diaphragm in the object plane of the objective lens field, i.e. that plane which is imaged onto the observation plane.

To readily satisfy these conditions simultaneously, and in accordance with my invention, a corpuscular-ray microscope having an area diaphragm located in front of a single field condenser-objective lens and imaged onto the object plane, is provided with a device for shifting the specimen carrier in the axial direction while the magnetomotive force (ampere turns) of the objective lens is kept constant, the range of axial shift being so chosen that the interesting details of all of the specimens to be investigated, irrespective of the specimen dimension in the beam direction, can be shifted into the object plane of the objective lens field and consequently into the plane where the image of the aperture diaphragm is located.

Displacing a specimen in the axial direction of the apparatus is known as such for electron microscopes with electrostatic or permanent-magnetic lenses. In such apparatus the focusing by mechanical displacement of the specimen has been preferred to the more difficult change in focal length of these types of lenses. A focusing has also been effected by varying the high voltage and hence the energy of the corpuscles (charge carriers) of the beam. This method, however, is disadvantageous from the outset because, as a rule, the beam voltage is virtually predetermined by the specimen to be investigated and by the type of investigation required.

To the extent the possibilities of axial specimen displacement have become known for apparatus with electromagnetic lenses, such apparatus have served as experimental or testing devices for determining the property of lenses or of entire corpuscular beam optical systems at different specimen positions.

In the known electrostatic and permanent-magnetic apparatus, the focusing by axial displacement of the specimen has been effected because the refractive power of the particular lenses employed could not be changed for technical reasons. In contrast thereto, a corpuscular-microscope with a pre-field condenser lens and an area-defining diaphragm according to the invention, is provided with means for axially displacing the specimen despite the fact that the objective lens is of the electromagnetic type so that its refractive power is readily variable within a large range. In this respect the invention is upon the recognition that there is one and only one definite excitation of the "condenser-objective single field lens" by which the single field condenser-objective lens will produce a sharp two-stage image of the diaphragm. The first image of such imaging is constituted by the greatly reduced image produced in the object plane by the pre-field condenser lens, whereas the second image resides in the magnified image effected by the main field of the lens arrangement, namely by the objective lens proper. The pre-field and the main field, that is the condenser lens and the objective lens thus combined to a single lens, are both of short focal length but need not necessarily have the same focal length.

By virtue of the invention this property of corpuscular-ray microscopes equipped with a pre-field condenser lens and an aperture diaphragm is fully utilized since the axial-shaft device permits placing the interesting details, of any specimen, regardless of its axial dimension, precisely into the object plane. Thus these details as well as the area diaphragm can always be sharply imaged simultaneously by means of the single objective-condenser lens.

The axial shifting of the specimen for the purposes of the invention may be secured by a variety of structural designs. According to one of the more specific features of the invention, the axial-shift device comprises a sleeve or the like annular member which coaxially surrounds the beam axis and supports the specimen carrier proper. The annular member is provided with gear teeth on its outer periphery and meshes with a pinion or gear on a control shaft extending from within through the wall of the vacuum vessel so as to be actuable from the outside of the microscope. In lieu of gear teeth, the annular member may carry a screw thread meshing with a threaded member rotatable from the outside of the microscope for thereby axially shifting the specimen carrier.

According to another way of axially shifting the specimen carrier from the outside, I mount the carrier on a member which is angularly displaceable about a pivot axis spaced from the beam axis and extending at a substantially right angle thereto. The pivot member is actuable by control means, preferably through a cam, with the aid of a tappet or rod extending through the wall of the vacuum vessel to the outside of the microscope.

The invention will be further described with reference to embodiments of corpuscular-ray apparatus according to the invention illustrated by way of example on the accompanying drawings.

Figure 1:
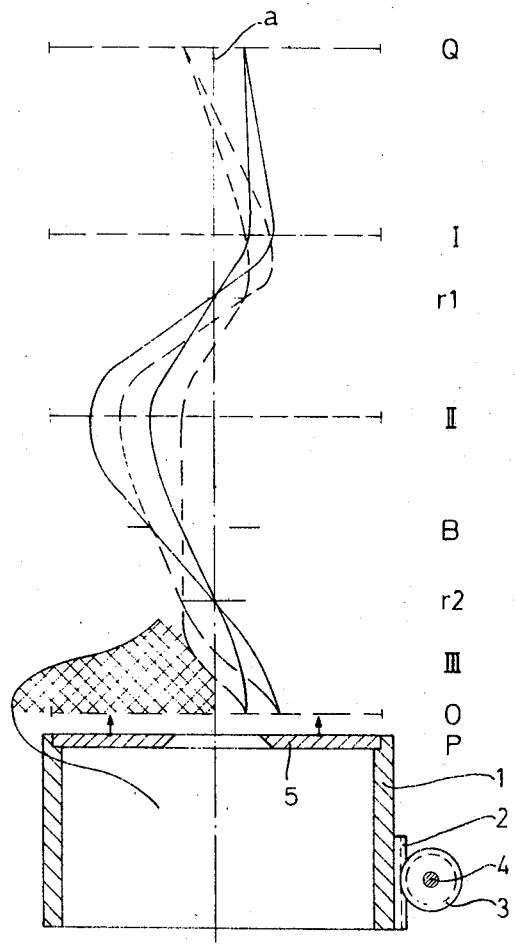
FIG. 1 shows schematically an electron microscope by representation of its beam system from the beam source to the specimen on the axial-shift device.

In FIG. 1 the eletcron-optical axis of the apparatus is denoted by $a$, this being also the normal axis of the electron beam issuing from the electron gun or other source located at Q. The above mentioned first and second condenser lenses are located at I and II, only the corresponding electron-optical planes being indicated. An aperture diaphragm is mounted between the second condenser lens II and the third condenser lens III, the latter being constituted by the pre-field of the objective lens whose object plane is located at O. A specimen is located at P on a carrier diaphragm. 5.

The two condenser lenses I and II serve as beam focusing means. The condenser I produces a reduced image $r1$ of the beam source Q (more accurately a reduced image of the crossover near the emitting cathode surface). The second condenser II having a relatively long focal length produces at $r2$ a sharp image of the reduced first image $r1$ of the beam source Q. The object plane O of the objective lens field is simultaneously the image plane of the aperture diaphragm B. The diaphragm B is located within the image-side focal length of condenser II and is sharply imaged in the plane O by means of the pre-field condenser III.

The field of the electromagnetic lens arrangement is represented at the left of the axis $a$ in the region of the object plane O. The pre-field identified by cross hatching constitutes the pre-field condenser III so that a single lens field performs as two lenses (condenser-objective single field lens).

The irradiation or illumination aperture of the specimen P is given by the size of the second image $r2$ of the beam source Q and is independent of the aperture size of diaphragm B which determines only the size of the illuminated specimen area, the latter being independent of the size of image $r2$. These independencies are precisely true only in the assumption that lens faults are negligible. Since the size of $r2$ is given by the magnifying ratios of the two condensers I and II, the size of the illumination aperture of the specimen can be controlled by changing one of the magnifying ratios of these lenses.

It is essential in this combination that the specimen P and the image of the area diaphragm B are both sharply imaged by means of the objective lens. It will be understood the further lenses, at least a projection lens, are located beneath the lens arrangement shown in FIG. 1 for projecting the combined specimen-disphragm image onto a luminescent screen or into a television-camera tube.

According to the invention, and as explained, provision is made to prevent any change in the magnetomotive force of the condenser-objective single field lens and hence any disturbance of the sharp image produced of the area diaphragm B in the object lens O. That is, instead of electrically or magnetically changing a lens, the invention provides a device that permits axially displacing the specimen P to such an extent that the plane of the specimen P can always be made to coincide with the object plane O. In the embodiment of FIG. 1, this device comprises an annular member, namely, a cylindrical sleeve 1 coaxially surrounding the beam axis $a$. On its other periphery this cylinder is provided with rack teeth 2 meshing with a pinion 3 on a drive shaft 4. The shaft passes through the wall of the vacuum chamber to the outside of the electron microscope, a seal being used where the shaft passes through the wall, such seals and drives being well known as such. It will be understood that three or more racks and pinions are preferably used in uniform distribution about the beam axis and that the cylinder 1 supporting the specimen carrier 5 proper, is preferably guided for axial linear motion in fixed structural parts of the microscope apparatus.

Figure 2:
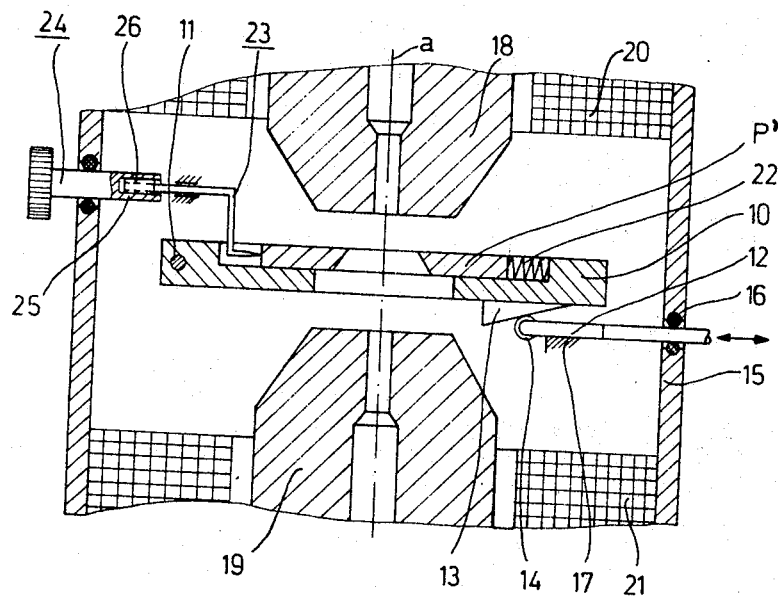
FIG. 2 shows in axial section a portion of an objective lens together with another form of an axial-shift device according to the invention.

In the embodiment shown in FIG. 2, specimen carrier diaphragm P′ is mounted on a member 10 which is angularly displaceable about a fixed pivot 11. The displacement is controlled by a tappet 12 whose end carries a roller 14 engaging a cam 13 in the form of an inclined plane mounted on the member 10. The tappet passes through the wall 15 of the microscope vacuum vessel where it is sealed with the aid of suitable sealing means 16 in known manner. The tappet 12 is supported at 17 in a fixed guide structure of the apparatus. While in the illustrated embodiment the member 10 rests upon the tappet roller 14 only under its own weight and that of the specimen carrier, the engagement between cam 13 and roller 14 may be improved by the provision of springs acting upon the member 10 and forcing it resiliently against the roller. Since the necessary shift of the specimen carrier in the axial direction of the electron beam is very small, the simultaneous motions of the specimen transverse to the axis $a$ appearing during angular displacement of the member 10 are negligibly slight.

The axial-shift device just described is located inside the objective lens structure whose pole pieces are denoted by 18 and 19, the magnetic field being produced by two cumulatively acting magnet windings 20 and 21 of roughly equal ampere turns.

The specimen carrier diaphragm P′ can be displaced transversely of the beam axis $a$ in opposition to a restoring spring 22. Such displacement is controlled with the aid of a pusher member 23 of angular shape which is horizontally displaceable but not rotatable in a fixed mounting structure of the apparatus and carries a threaded portion engaged by an interiorly threaded sleeve 25. The sleeve extends through a vacuum seal to the outside of the microscope, the exterior portion forming a handle or actuator 24.

The pivot pin 11 may be replaced by any other suitable form of mounting that permits slight angular displacement of the member 10. Suitable mounting means, for example, are a spring system or a spring clamp in which the left-hand end of member 10 is held.

To those skilled in the art it will be obvious upon the study of this disclosure, that there are various other ways of securing an axial displacement of the specimen for the purposes of the invention and hence that the invention can be given embodiments other than particularly illustrated and described herein, without departing from the essential features of the invention as set forth in the claims annexed hereto.

I claim:

1. A corpuscular-ray microscope, such as an electron microscope, defining a beam axis and having beam focusing means, an electromagnetic objective lens, a specimen carrier for accommodating a specimen substantially in the axial region where said objective lens has maximal field strength, an area-limiting aperture diaphragm located in front of the entrance pupil plane of said objective lens, said objective lens having a condenser-lens field which forms an image of said diaphragm in the object plane of said objective lens, said aperture diaphragm being arranged at such an axial location relative to the focusing means that the beam rays passing through the diaphragm aperture are converged by the focusing means to a beam cross section of high current intensity in the entrance pupil plane of the objective lens, in combination with an axial-shift device connected with said specimen carrier for axially displacing said carrier at constant magnetomotive force of said objective lens, said device having a range of carrier axial displacement within which the details to be investigated of any applicable specimen, regardless of its axial dimension, can be shifted into said object plane where said image of said diaphragm is located.

2. In a corpuscular-ray microscope according to claim 1, said axial-shift device comprising an annular member coaxially surrounding said beam axis and displaceable in the axial direction, said member being joined with said specimen carrier, a revolvable drive shaft actuable from the outside of the microscope, and transmission means connecting said shaft to said annular member, whereby revolving said shaft causes axial displacement of said member.

3. In a corpuscular-ray microscope according to claim 1, said axial-shift device comprising a member angularly displaceable about a pivot axis spaced from said beam axis and extending at a right angle thereto, said specimen carrier being mounted on said member, and control means actuable from the outside of the microscope and connected to said member for displacing it about said pivot axis so as to thereby axially shift said specimen carrier.

4. In corpuscular-ray microscope according to claim 3, said control means comprising a cam on said member and a tappet engaging said cam and movable from the outside of the microscope to cause displacement of said member.

References Cited

UNITED STATES PATENTS

| | | | |
|---|---|---|---|
| 2,714,678 | 8/1955 | Wolff | 313—84 |
| 2,802,110 | 8/1957 | Kazato et al. | 250—49.5 |
| 3,173,005 | 3/1965 | Suzuki | 250—49.5 |
| 3,191,028 | 6/1965 | Crewe | 250—49.5 |

RALPH G. NILSON, Primary Examiner

C. E. CHURCH, Assistant Examiner